United States Patent
Dinan et al.

(10) Patent No.: US 8,259,600 B1
(45) Date of Patent: Sep. 4, 2012

(54) AIR INTERFACE QUALITY

(75) Inventors: Esmail Hejazi Dinan, Herndon, VA (US); Vijay Rudraraju, Herndon, VA (US); Howard Bishop Anderson, Ashburn, VA (US); Hemanth Balaji Pawar, Herndon, VA (US); Daniel A. Vivanco, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 630 days.

(21) Appl. No.: 12/139,232

(22) Filed: Jun. 13, 2008

(51) Int. Cl.
*H04L 12/26* (2006.01)
*H04W 4/00* (2009.01)
*H04B 7/00* (2006.01)

(52) U.S. Cl. ......... 370/252; 370/329; 370/330; 455/509

(58) Field of Classification Search .......... 370/229–235, 370/252, 253, 260, 328, 207, 329, 335, 342, 370/376, 395.4, 459, 468
See application file for complete search history.

(56) References Cited

U.S. PATENT DOCUMENTS

| | | | |
|---|---|---|---|
| 6,400,954 B1 * | 6/2002 | Khan et al. ............... | 455/450 |
| 6,996,374 B1 | 2/2006 | Bao et al. | |
| 7,103,371 B1 * | 9/2006 | Liu ........................... | 455/456.4 |
| 7,142,523 B1 | 11/2006 | Chekuri et al. | |
| 7,263,382 B2 * | 8/2007 | Chandhok et al. ......... | 455/556.1 |
| 2004/0253940 A1 * | 12/2004 | Andrews et al. ............. | 455/405 |
| 2005/0059417 A1 * | 3/2005 | Zhang et al. ................. | 455/515 |
| 2007/0036087 A1 | 2/2007 | Kangru | |
| 2007/0116009 A1 | 5/2007 | Kangru et al. | |

OTHER PUBLICATIONS

Gimarc, "Analytical Techniques to Improve Your Application Profile", 2006, CMG.*
Norlund, "Fairness Measures for Best Effort Traffic in Wireless Networks", 2004, 15$^{th}$ IEEE International Symposium.*
Shih "Dynamic Bandwidth Allocation for QoS routing on TDMA-based mobile ad hoc networks", Nov. 22, 2005, Computer Communications.*

* cited by examiner

*Primary Examiner* — Nittaya Juntima
*Assistant Examiner* — Samina Choudhry
(74) *Attorney, Agent, or Firm* — O'Brien Jones PLLC

(57) ABSTRACT

A throughput of an air interface is recorded during a plurality of intervals to produce a set of recorded throughputs. A slot utilization is also recorded during each of the plurality of intervals to produce a set of recorded slot utilizations. A slot is an allocation of time and frequency. A linear regression on the data points of the set of recorded throughputs and the set of recorded slot utilizations is performed to produce a regression line of throughput versus slot utilization. An indicator of air interface quality is calculated based on the slope of the regression line.

13 Claims, 5 Drawing Sheets

AIR INTERFACE QUALITY

TECHNICAL BACKGROUND

Wireless communication may be used as a means of accessing a communication network and has certain advantages over wired communications for accessing a communication network. One of those advantages is a low cost of infrastructure to provide access to many separate mobile devices. To use wireless communication to access a network, a customer device needs to have at least one transceiver in active communication with another transceiver that is connected to the network.

To facilitate wireless communication, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as evolution-data optimized (EV-DO). The European Telecommunications Standards Institute (ETSI) has also promulgated a standard known a long term evolution (LTE). All of these standards may include specifications for various aspects of wireless communication with a network. This includes processes for registering on the network, carrier modulation, frequency bands of operation, and message formats.

OVERVIEW

A method of determining an indicator of air interface quality is disclosed. A throughput of an air interface is recorded during a plurality of intervals to produce a set of recorded throughputs. A slot utilization is also recorded during each of the plurality of intervals to produce a set of recorded slot utilizations. A slot is an allocation of time and frequency. A linear regression on the data points of the set of recorded throughputs and the set of recorded slot utilizations is performed to produce a regression line of throughput versus slot utilization. An indicator of air interface quality is determined based on the slope of the regression line.

A method of analyzing a communication system is disclosed. A slot utilization is measured during a first interval to determine if the slot utilization satisfies a first utilization criteria. A packet drop rate is measured during a second interval to determine if the packet drop rate satisfies a first packet drop criteria. An uplink air interface quality indicator is determined. A downlink air interface quality indicator is determined. An air interface problem is diagnosed based on the slot utilization, the packet drop rate, the uplink air interface quality indicator, and the downlink air interface quality indicator.

A slot utilization is measured during a first interval to determine if the slot utilization satisfies a first utilization criteria. A packet drop rate is measured during a second interval to determine if the packet drop rate satisfies a first packet drop criteria. In response to the slot utilization satisfying the first utilization criteria and the packet drop rate satisfying the first packet drop criteria, a first linear regression is performed on data points of a first set of recorded throughputs and a first set of recorded slot utilizations. This produces a first regression line of throughput versus slot utilization. A first air interface quality indicator is based on the slope of the first regression line. An air interface quality problem is diagnosed based on the slot utilization, packet drop rate, and the first air interface quality indicator.

DETAILED DESCRIPTION

Figure 1:
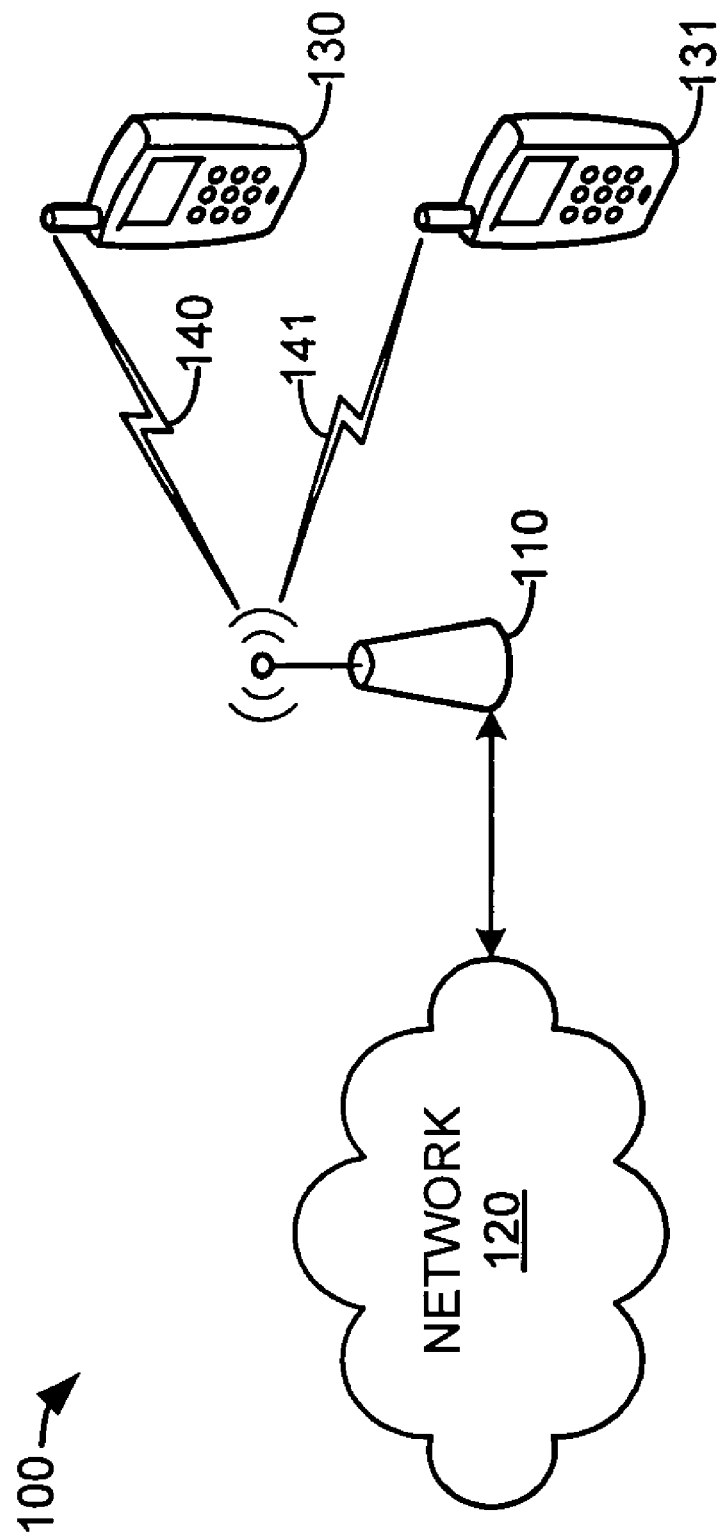
FIG. 1 is a block diagram illustrating a communication system.

FIG. 1 is a block diagram illustrating a communication system. In FIG. 1, communication system 100 comprises base station 110, network 120, wireless device 130, wireless device 131, wireless link 140, and wireless link 141.

Wireless devices 130 and 131 may be operatively coupled to base station 110 by wireless links 140 and 141, respectively. Base station 110 is operatively coupled to network 120. Thus, wireless devices 130 and 131 may be operatively coupled to network 120.

Wireless device 130 or wireless device 131 may be any device, system, combination of devices, or other such communication platform capable of communicating with base station 110 via wireless links. Wireless device 130 and wireless device 131 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides the air interface to wireless device 130 and wireless device 131 and communication connectivity to network 120. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 120 may comprise a computer, a network, or a collection of computers and networks that couple, link, or otherwise operatively provide wireless device 130 or wireless device 131 with communication service. It should be understood that network 120 may comprise secondary data networks. For example, network 120 may include a backhaul network, a local network, a long distance network, a packet network, or any combination thereof, as well as other types of networks. Network 120 may be or include an access service network (ASN), an access service network gateway (ASN-GW), wireless local access network access gateway (WAG), packet data gateway (PDG), mobile switching center (MSC) and packet data serving node (PDSN).

Wireless device 130 and wireless device 131 may establish communication sessions with base station 110 in order to receive communication services via network 120 and wireless links 140 and 141, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of information that can be exchanged via wireless links 140 and 141 depends upon air interface factors such as the number of wireless devices communicating via base station 110, interference, clutter, morphology, wireless device location, and wireless device mobility. To address user performance expectations, additional base stations may be added to improve one or more of these air interface factors. However, simply adding base stations may be expensive, and may not improve the user experience.

An air interface quality indicator may be determined for communication system 100 to help detect or diagnose problems. The air interface quality indicator may also be used to help determine an appropriate course of action to improve the user experience.

Communication system 100 may measure physical layer throughput. Physical layer throughput is the number of bits per a unit of time carried through the physical layer (e.g., wireless links 140 and 141) for all of the wireless devices communicating with base station 110.

Communication system 100 may measure physical layer throughput in a downlink direction (e.g., traffic flowing from base station 110 to wireless device 130 and wireless device 131). Communication system 100 may measure physical layer throughput in an uplink direction (e.g., traffic flowing to base station 110 from wireless device 130 and wireless device 131). Communication system 100 may use base station 110 to measure and record physical layer throughput. Communication system 100 may use other devices to measure physical layer throughput.

Communication system 100 may measure a media access control (MAC) layer throughput. MAC layer throughput is the amount of information carried by the MAC layer. MAC layer throughput is the throughput of the air interface seen by the transport layers. MAC throughput depends on at least: (1) the configuration of communication system 100; (2) the number of wireless devices transferring data; (3) the amount of data transferred by each user; (4) the radio frequency (RF) conditions; and, (5) MAC layer overhead packets.

Communication system 100 may measure MAC layer throughput in a downlink direction. Communication system 100 may measure MAC layer throughput in an uplink direction. Communication system 100 may use base station 110 to measure and record MAC layer throughput. Communication system 100 may use other devices to measure MAC layer throughput.

Communication system 100 may measure slot utilization. A slot is a particular allocation of time (or symbol) and frequency used to transfer information between base station 110 and wireless device 130 or wireless device 131. Slot utilization may be expressed as a percentage (or ratio) of slots that are allocated to transmit information out of a total number of available slots. Slot utilization depends on at least: (1) MAC layer throughput, and (2) RF conditions. Poor RF conditions result higher slot utilization because communication system 100 needs to use lower order modulation schemes, higher redundancy codes, and packet retransmission on wireless links 140 or 141 when RF conditions degrade.

Communication system 100 may measure slot utilization in a downlink direction. Communication system 100 may measure slot utilization in an uplink direction. Communication system 100 may use base station 110 to measure and record slot utilization. Communication system 100 may use other devices to measure slot utilization.

Communication system 100 may measure packet drop rate. Communication system 100 may measure packet drop rate in a downlink direction. Communication system 100 may measure packet drop rate in an uplink direction. Communication system 100 may use base station 110 to measure and record packet drop rate. Communication system 100 may use other devices to measure packet drop rate.

Communication system 100 may measure physical layer throughput, MAC layer throughput, slot utilization, a number of users (i.e., the number of wireless devices transferring data), or packet drop rate over multiple time intervals. For example, communication system 100 may measure MAC layer throughput and slot utilization over a period of 15 minutes. Communication system may average the slot utilization or MAC layer throughput to produce an average slot utilization or MAC layer throughput for the interval. Communication system may record these 15-minute averages for a period of time such as 24 hours, or 30 days.

The data points for these 15-minute averages may be used as the basis for determining an air interface quality indicator. The data points for slot utilization and MAC layer throughput for each 15-minute interval may be the input variables for a linear regression analysis. This linear regression analysis may produce a regression line that relates MAC layer throughput to slot utilization. The slope of the regression line may be used as a basis for an air interface quality indicator.

In an example, the slope of the regression line for the downlink MAC layer throughput and the downlink slot utilization may be divided by 17.28 Mbps to produce an uplink air interface quality (AIQ) factor. The number 17.28 Mbps is chosen to normalize the AIQ factor to the range of between zero (0.0) and one (1.0) for a 10 MHz WiMAX downlink channel which has a 17.28 Mbps maximum throughput. Other numbers can be chosen according the maximum MAC layer throughput and most efficient modulation and coding schemes that may be utilized by communication system 100.

In another example, the slope of the regression line for the uplink MAC layer throughput and uplink slot utilization may be divided by 8.4 Mbps to produce an uplink AIQ factor. The number 8.4 Mbps is chosen to normalize the AIQ factor to the range of between 0.0 and 1.0 for a 10 MHz WiMAX uplink channel which has an 8.4 Mbps maximum throughput. Other numbers can be chosen according the maximum MAC layer throughput and most efficient modulation and coding schemes that may be utilized by communication system 100.

The AIQ factor may be used to determine certain information about the functioning of communication system 100. The following examples are based on the 10 MHz WiMAX channel discussed, above. Other communication systems may have other coefficients and formulas.

In an example, the number of bits transferred in a slot is equal to the AIQ factor multiplied by 240 (i.e., # bits per slot=240*AIQ). The maximum number of bytes transmitted in the downlink direction is: 2.16*AIQ bytes/s. The maximum number of bytes transmitted in the uplink direction is: 1.05*AIQ bytes/s. The maximum downlink capacity of base station 110 in terms of bytes per hour can be calculated as: 7776*AIQ bytes/hr. The maximum uplink capacity of base station 110 in terms of bytes per hour can be calculated as: 3780*AIQ bytes/hr The AIQ factor may also be used with other recorded data to diagnose a problem with communication system 100. For example, problems with system optimization, coverage, or capacity of communication system 100 may be diagnosed based on slot utilization, packet drop rate, and an AIQ factor. A coverage problem may indicate that adjustments to a base station's antenna are needed to better cover a highly used area with bad air interface conditions. An optimization problem may indicate that there is a bottleneck somewhere in the system, such as a low bandwidth backhaul link. A capacity issue may indicate that additional equipment is needed at a base station to handle the traffic passing through that base station. An example decision table is given in Table 1.

TABLE 1

| Problem | Slot Utilization and Packet Drop Rate | AIQ factors DL = downlink UL = uplink |
|---|---|---|
| No Problem | Utilization < 50% and Drop Rate < 1% | N/A |
| Capacity | 50% < Utilization < 55% or 1% < Drop Rate < 1.3% | DL AIQ > 0.3 or UL AIQ > 0.2 |
| Coverage or Optimization | 50% < Utilization < 55% or 1% < Drop Rate < 1.3% | DL AIQ < 0.3 or UL AIQ < 0.2 |
| Coverage, Optimization, or Capacity | 50% < Utilization < 55% or 1% < Drop Rate < 1.3% | $0.2 \leq$ DL AIQ $\leq 0.3$ or $0.15 \leq$ UL AIQ $\leq 0.2$ |
| Capacity | Utilization > 55% or Drop Rate > 1.3% | DL AIQ > 0.3 and UL AIQ > 0.2 |
| Coverage or Optimization | Utilization > 55% or Drop Rate > 1.3% | DL AIQ < 0.3 or UL AIQ < 0.2 |
| Coverage, Optimization, or Capacity | Utilization > 55% or Drop Rate > 1.3% | $0.2 \leq$ DL AIQ $\leq 0.3$ or $0.15 \leq$ UL AIQ $\leq 0.2$ |

Figure 2:
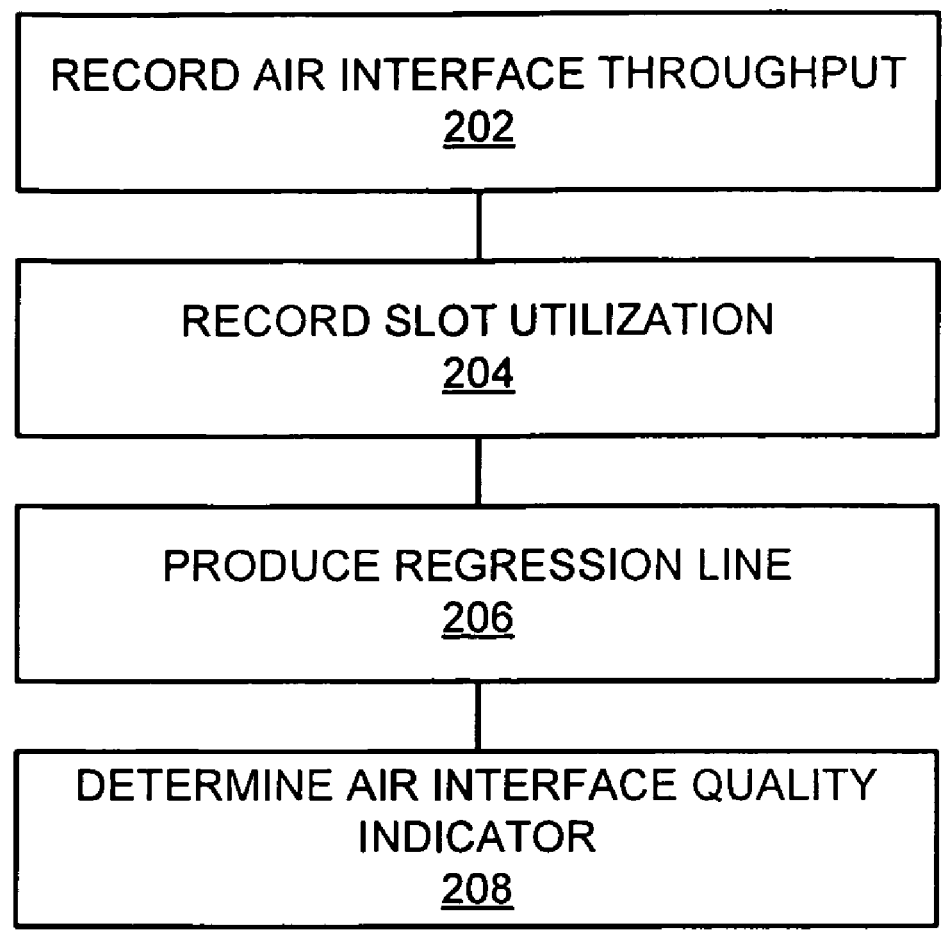
FIG. 2 is a flowchart illustrating a method of determining an air interface quality indicator.

FIG. 2 is a flowchart illustrating a method of determining an air interface quality indicator. The steps illustrated in FIG. 2 may be performed by one or more elements of communication system 100.

An air interface throughput is recorded (202). For example, base station 110 may measure and record an average throughput exchanged in either the uplink direction, downlink direction, or both, with all of the wireless devices it is communicating with. The average throughput may be measured at the physical layer or the MAC layer. The average throughput may be measured over a time interval such as 15 minutes. The average throughput may be measured over multiple of time intervals. For example, base station 110 may measure and record an average air interface throughput for each 15-minute interval over a period of approximately one month.

An air interface slot utilization is recorded (204). For example, base station 110 may measure and record an average slot utilization in either the uplink or downlink direction. The average slot utilization may be measured at the physical layer or the MAC layer. The slot utilization may be measured for only the downlink or uplink burst zones of a frame. The average slot utilization may be measured over a time interval such as 15 minutes. The average slot utilization may be measured over multiple of time intervals. For example, base station 110 may measure an average air interface slot utilization for each 15-minute interval over a period of approximately one month. These time intervals may be the same as, or overlap, the time intervals used to measure average throughput.

A regression line is produced (206). For example, linear regression may be applied to the throughput and slot utilization data points recorded in steps 202 and 204 to produce slope and intercept coefficients for a regression line that relates throughput to slot utilization.

An air interface quality indicator is determined (208). For example, an air interface quality indicator may be determined based on a slope coefficient calculated in step 206. In an embodiment, an air interface quality indicator is determined by dividing a slope coefficient that relates throughput to slot utilization by the maximum throughput of an air interface. The maximum throughput of an air interface may be determined by the characteristics of the air interface. In an example, the maximum throughput of a 10 MHz per channel WiMAX system is 17.28 Mbps in the downlink direction and 8.4 Mbps in the uplink direction.

Figure 3:
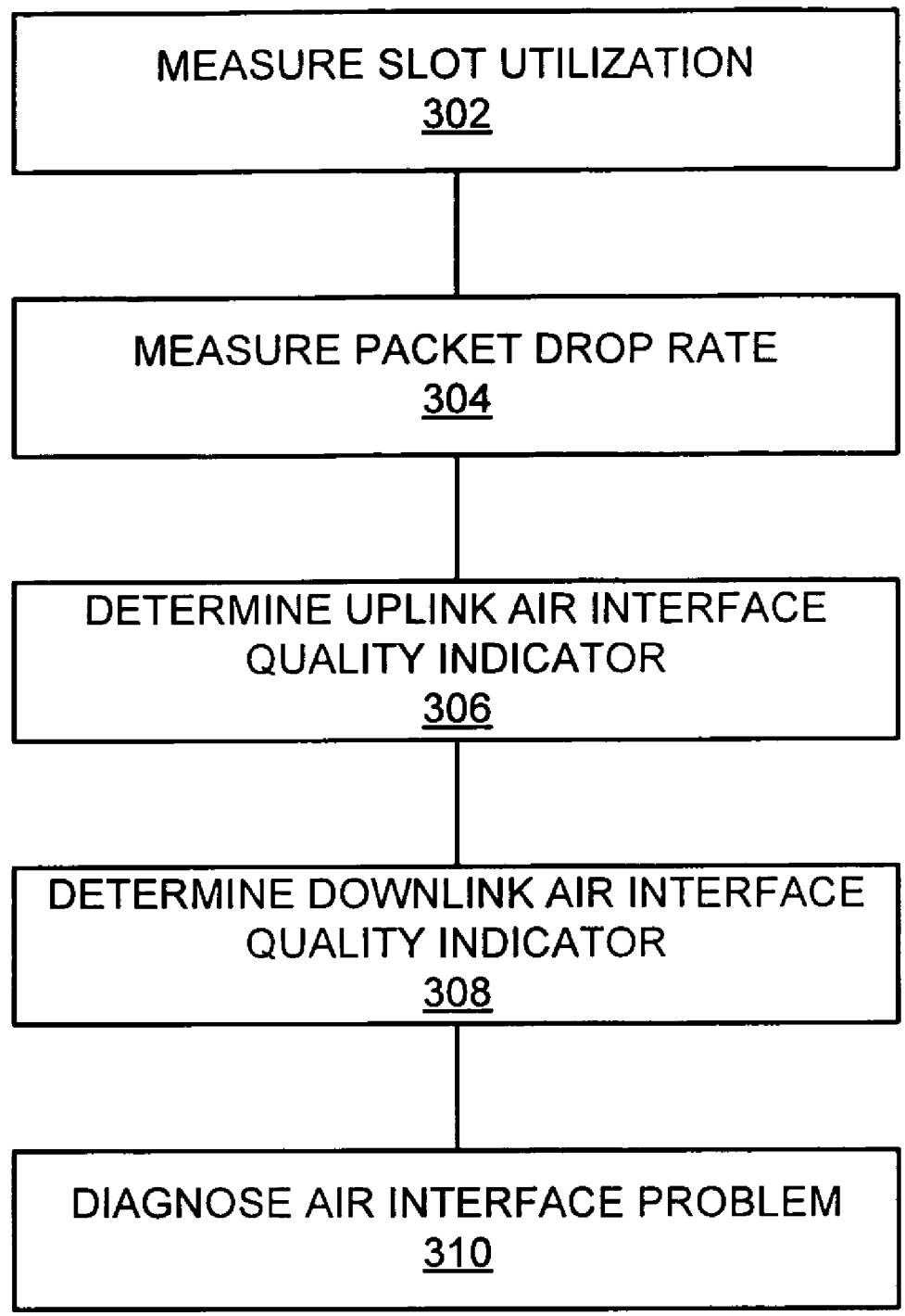
FIG. 3 is a flowchart illustrating a method of analyzing a communication system.

FIG. 3 is a flowchart illustrating a method of analyzing a communication system. The steps illustrated in FIG. 3 may be performed by one or more elements of communication system 100.

A slot utilization is measured (302). For example, base station 110 may measure and record an average slot utilization in either the uplink direction, downlink direction, or both. The average slot utilization may be measured at the physical layer or the MAC layer. The slot utilization may be measured for only the downlink or uplink burst zones of a frame. The average slot utilization may be measured over a time interval such as 15 minutes. The average slot utilization may be measure over a long-term time interval such as a week or month. The average slot utilization may be measured over multiple of time intervals. For example, base station 110 may measure an average air interface slot utilization for each 15-minute interval over a period of approximately one month.

A packet drop rate is measured (304). For example, base station 110 may measure and record a packet drop rate in either the uplink direction, downlink direction, or both. The packet drop rate may be measured at the MAC layer or at a transport layer. The packet drop rate may be measured over a time interval such as 15 minutes. The packet drop rate may be measure over a long-term time interval such as a week or month. The packet drop rate may be measured over multiple time intervals. For example, base station 110 may measure the packet drop rate for each 15-minute interval over a period of approximately one month. These time intervals may be the same as, or overlap, the time intervals used to measure slot utilization.

An uplink air interface quality indicator is determined (306). For example, the method illustrated in FIG. 2 may be used by communication system 100 to determine an uplink air interface quality indicator. A downlink air interface quality indicator is determined (308). For example, the method illustrated in FIG. 2 may be used by communication system 100 to determine a downlink air interface quality indicator.

An air interface problem is diagnosed (310). For example, the uplink and downlink air interface quality indicators determined in steps 306 and 308, respectively, may be used in conjunction with the slot utilization and packet drop rate measured in steps 302 and 304, respectively, to determine if there is an air interface problem. It may also be determined whether the problem may be with capacity, coverage, or system optimization. In an embodiment, Table 1 may be used as a decision table to help diagnose an air interface problem using an uplink air interface quality indicator, a downlink air interface quality indicator, a slot utilization, and a packet drop rate.

Figure 4:
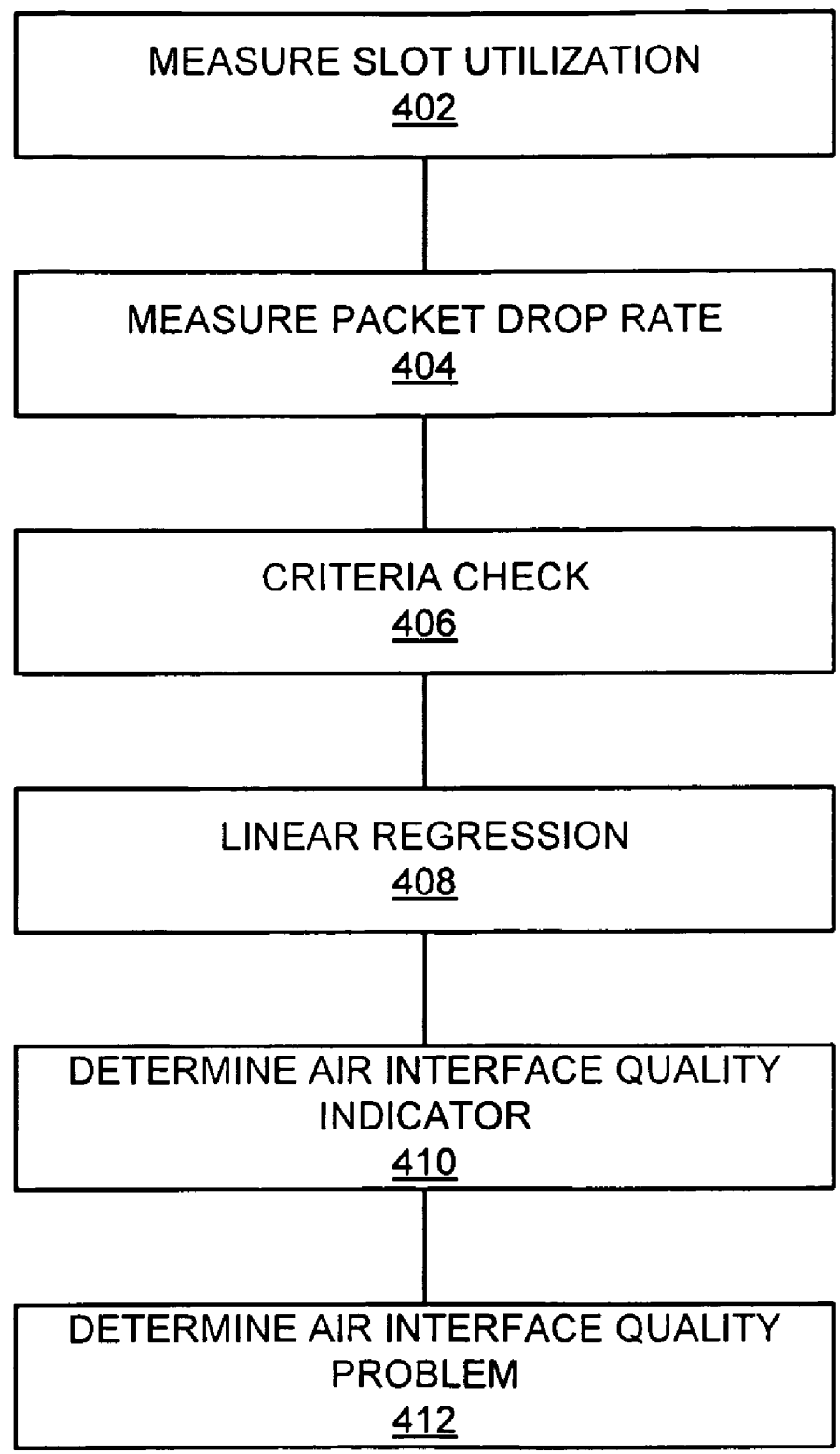
FIG. 4 is a flowchart illustrating a method of analyzing a communication system.

FIG. 4 is a flowchart illustrating a method of analyzing a communication system. The steps illustrated in FIG. 4 may be performed by one or more elements of communication system 100.

A slot utilization is measured (402). For example, base station 110 may measure and record an average slot utilization in the uplink direction, the downlink direction, or both. The average slot utilization may be measured at the physical layer or the MAC layer. The slot utilization may be measured for only the burst zones of a frame. The average slot utilization may be measured over a time interval such as 15 minutes. The average slot utilization may be measure over a long-term time interval such as a week or month. The average slot utilization may be measured over multiple time intervals. For example, base station 110 may measure an average air interface slot utilization for each 15-minute interval over the period of approximately one month.

A packet drop rate is measured (404). For example, base station 110 may measure and record a packet drop rate in either the uplink direction, downlink direction, or both. The packet drop rate may be measured at the MAC layer or at a transport layer. The packet drop rate may be measured over a time interval such as 15 minutes. The packet drop rate may be measured over a long-term time interval such as a week or month. The packet drop rate may be measured over multiple time intervals. For example, base station 110 may measure the packet drop rate for each 15-minute interval over a period of approximately one month. These time intervals may be the same as, or overlap, the time intervals used to measure slot utilization.

A criteria is checked (406). For example, the slot utilization measured in step 402 may be checked to determine if it satisfies a threshold. In an embodiment, the slot utilization may be checked to determine if it exceeds a threshold of 50%. In an embodiment, the slot utilization may be checked to determine if it exceeds a threshold of 55%. In an embodiment, the slot utilization may be checked to determine if it satisfies one or more criteria shown in Table 1.

In another embodiment, the criteria may involve multiple checks or thresholds such as the average number of users exceeding a threshold when the slot utilization satisfies a criteria. For example, the criteria may be that the slot utilization exceed a threshold and the packet drop rate also satisfy another criteria. In another example, the criteria may be that the slot utilization exceed a threshold percentage when there are more than a threshold number of users. In another example, the criteria may be that the slot utilization exceed a first threshold percentage when there are more than a second threshold number of users more than a third threshold number times in a month.

In another example, the packet drop rate measured in step 404 may be checked to determine if it satisfies a threshold. In an embodiment, the packet drop rate may be checked to determine if it exceeds a threshold of 1%. In an embodiment, the packet drop rate may be checked to determine if it exceeds a threshold of 1.3%. In an embodiment, the packet drop rate may be checked to determine if it satisfies a criteria shown in Table 1.

In another embodiment, the criteria may involve multiple checks or thresholds such as the packet drop rate exceeding a threshold when the slot utilization satisfies a criteria. For example, the criteria may be that the slot utilization exceeds a first threshold and the packet drop rate exceeds a second threshold criteria. In an embodiment, the criteria may be that the slot utilization exceeds a first threshold or the packet drop rate exceeds a second threshold when there are more than a third threshold number of users more than a fourth threshold number times in a month. For example, the criteria may be that the slot utilization exceeds 50% or the packet drop rate exceeds 1% when the number of users is greater than three more than 144 times in a month.

In an embodiment, an AIQ may be determined and used as a basis to trigger a diagnosis according to the steps illustrated in FIG. 2. The steps illustrated in FIG. 2 may include determining a second AIQ.

Steps 408, 410, and 412 may be performed in response to the result of the criteria check in step 406. A linear regression is performed (408). For example, linear regression may be performed on data points that relate slot utilization to a throughput. This linear regression may produce slope and intercept coefficients that describe a regression line.

An air interface quality indicator is determined (410). For example, an air interface quality indicator may be determined based on the slope of a regression line produced in step 408. In an embodiment, an air interface quality indicator is determined by dividing a slope coefficient that relates throughput to slot utilization by the maximum throughput of an air interface. The maximum throughput of an air interface may be determined by the characteristics of the air interface. In an example, the maximum throughput of a 10 MHz per channel WiMAX system is 17.28 Mbps in the downlink direction and 8.4 Mbps in the uplink direction.

An air interface quality problem is diagnosed (412). For example, an uplink or a downlink air interface quality indicator, or both, as determined in step 408 may be used in conjunction with the slot utilization and packet drop rate measured in steps 402 and 404, respectively, to determine if there is an air interface quality problem. It may also be determined whether the problem may be with capacity, coverage, or system optimization. In an embodiment, Table 1 may be used as a decision table to help diagnose an air interface quality problem using an uplink air interface quality indicator, a downlink air interface quality indicator, a slot utilization, and a packet drop rate.

The methods, systems, networks, devices, and base stations described above may be implemented with, contain, or be executed by one or more computer systems. The methods described above may also be stored on a computer readable medium. The elements of communication network 100 may comprise, or include computers systems. This includes, but is not limited to base station 110, network 120, wireless device 130 and wireless device 131.

Figure 5:
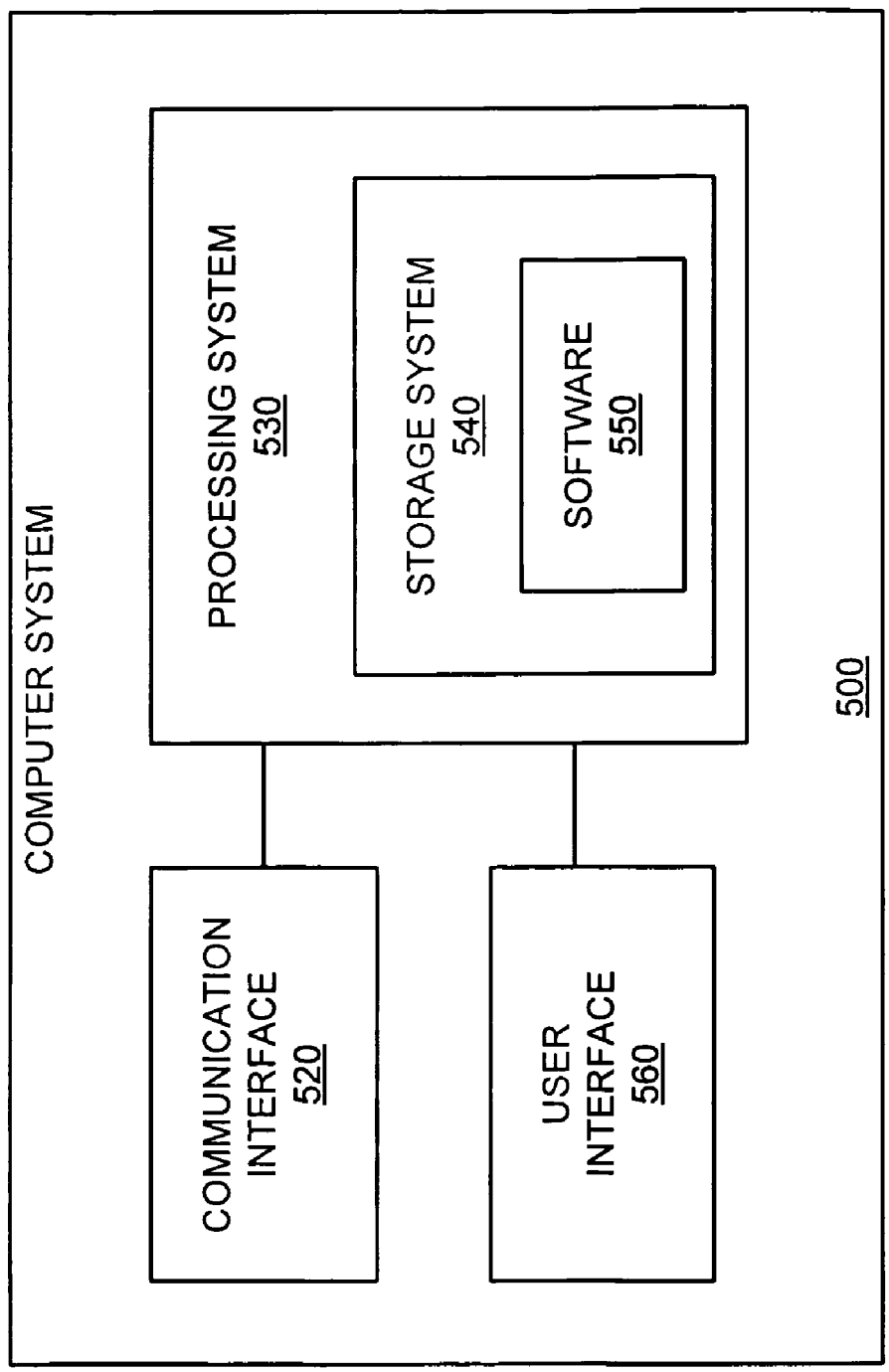
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining an indicator of air interface quality of a communication system, comprising:
    recording, by a device coupled to the communication system, a throughput of an air interface during a plurality of intervals to produce a set of recorded throughputs;
    recording a slot utilization during each of the plurality of intervals to produce a set of recorded slot utilizations, wherein each slot comprises an allocation of time and frequency;
    performing a linear regression on data points of the set of recorded throughputs and the set of recorded slot utilizations, to produce a regression line of throughput versus slot utilization; and,
    determining the indicator of air interface quality based on the slope of the regression line.

2. The method of claim 1, wherein the throughput is measured at a media access control layer.

3. The method of claim 1, wherein the slot utilization is a ratio of slots allocated to transmit information and a total number of available slots.

4. The method of claim 1, wherein the throughput is recorded for a downlink air interface.

5. The method of claim 1, wherein the throughput is recorded for an uplink air interface.

6. The method of claim 1, wherein a slot comprises a plurality of symbols.

7. A method of analyzing a communication system, comprising:
    measuring, by a device coupled to the communication system, a slot utilization during a first interval to determine if the slot utilization satisfies a first utilization criteria, wherein each slot comprises an allocation of time and frequency;
    measuring a packet drop rate during a second interval to determine if the packet drop rate satisfies a first packet drop criteria;
    recording, by a device coupled to the communication system, a throughput of an air interface during a plurality of intervals to produce a first set of recorded throughputs and a slot utilization during each of the plurality of intervals to produce a first set of recorded slot utilizations, wherein each slot comprises an allocation of time and frequency, when the slot utilization satisfies the first utilization criteria and the packet drop rate satisfies the first packet drop criteria;
    performing a first linear regression on data points of the first set of recorded throughputs and the first set of recorded slot utilizations, to produce a first regression line of throughput versus slot utilization;
    determining a first air interface quality indicator based on the slope of the first regression line; and,
    determining an air interface quality problem based on the slot utilization, packet drop rate, and the first air interface quality indicator.

8. The method of claim 7, wherein the first set of recorded throughputs is measured at a media access control layer.

9. The method of claim 7, wherein the first set of recorded slot utilizations is based on a ratio of slots allocated to transmit information to a total number of available slots.

10. The method of claim 7, wherein the first set of recorded throughputs is recorded for a downlink air interface.

11. The method of claim 7, wherein the first set of recorded throughputs is recorded for an uplink air interface.

12. The method of claim 7, further comprising:
    performing a second linear regression on data points of a second set of recorded throughputs and a second set of recorded slot utilizations, to produce a second regression line of throughput versus slot utilization;
    determining a second air interface quality indicator based on the slope of the second regression line; and,
    wherein the an air interface quality problem is determined based on the second air interface quality indicator.

13. The method of claim 12, wherein the first set of recorded throughputs are based on a downlink throughput and the second set of recorded throughputs are based on an uplink throughput.

* * * * *